(12) United States Patent
Yan

(10) Patent No.: US 9,848,059 B2
(45) Date of Patent: Dec. 19, 2017

(54) CONTENT HANDLING METHOD, APPARATUS, AND SYSTEM

(71) Applicant: Huawei Technologies Co., Ltd., Shenzhen (CN)

(72) Inventor: Zhefeng Yan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 581 days.

(21) Appl. No.: 14/311,075

(22) Filed: Jun. 20, 2014

(65) Prior Publication Data

US 2014/0304369 A1    Oct. 9, 2014

Related U.S. Application Data

(63) Continuation of application No. PCT/CN2013/078434, filed on Jun. 28, 2013.

(30) Foreign Application Priority Data

Jun. 28, 2012   (CN) .......................... 2012 1 0218512

(51) Int. Cl.
  *G06F 15/16* (2006.01)
  *H04L 29/08* (2006.01)
  *H04L 12/18* (2006.01)

(52) U.S. Cl.
  CPC .......... *H04L 67/32* (2013.01); *H04L 12/1886* (2013.01); *H04L 67/327* (2013.01); *H04L 67/06* (2013.01); *H04L 67/1097* (2013.01)

(58) Field of Classification Search
  CPC ... H04L 12/1886; H04L 67/32; H04L 67/327; H04L 1/0041; H04L 47/10; H04L 67/108;
  (Continued)

(56) References Cited

U.S. PATENT DOCUMENTS 6,529,508 B1 *  3/2003  Li .......................... H04L 45/302
                                                            370/392
2001/0053225 A1  12/2001  Ohira et al.
(Continued)

FOREIGN PATENT DOCUMENTS

CN       1854757 A    11/2006
CN     101163258 A     4/2008
(Continued)

OTHER PUBLICATIONS

Foreign Communication From a Counterpart Application, Chinese Application No. 201210218512.6, Chinese Office Action dated Dec. 28, 2015, 7 pages.
(Continued)

*Primary Examiner* — Dustin Nguyen
*Assistant Examiner* — Hao Nguyen
(74) *Attorney, Agent, or Firm* — Conley Rose, P.C.

(57) ABSTRACT

The method includes: receiving a content-requesting message sent by a terminal; determining coding block information corresponding to a requested content according to a name of the requested content and pre-stored coding block information; performing an AND operation on a request identifier respectively with attribute fields in the coding block information corresponding to the requested content, and obtaining a coding block corresponding to an attribute field with which the AND operation produces a non-zero result and which is not part of excluded information as a first target coding block; and sending a first content reply message including the first target coding block and the corresponding attribute field thereof to the terminal.

9 Claims, 12 Drawing Sheets

(58) Field of Classification Search
CPC ... H04L 67/06; H04L 45/00; H04L 29/08477; H03M 13/3761; H04W 36/023
USPC ........... 709/217, 230, 246; 375/242, 250; 370/331, 392, 395.21; 703/14
See application file for complete search history.

(56) References Cited

U.S. PATENT DOCUMENTS

| | | | | |
|---|---|---|---|---|
| 2009/0198825 | A1* | 8/2009 | Miller | H04L 67/104 709/230 |
| 2009/0204727 | A1 | 8/2009 | Wang et al. | |
| 2010/0195655 | A1* | 8/2010 | Jacobson | H04L 45/748 370/392 |
| 2011/0142141 | A1* | 6/2011 | Huang | H03M 13/3761 375/242 |
| 2013/0073274 | A1* | 3/2013 | Mucklow | G06F 17/504 703/14 |
| 2013/0163610 | A1* | 6/2013 | Ko | H04L 67/327 370/428 |
| 2013/0166491 | A1* | 6/2013 | Zhang | G06N 5/02 706/47 |
| 2013/0275618 | A1* | 10/2013 | Puttaswamy Naga | H04L 67/2842 709/236 |

FOREIGN PATENT DOCUMENTS

| | | |
|---|---|---|
| CN | 101174955 A | 5/2008 |
| CN | 101945129 A | 1/2011 |
| EP | 2120402 A1 | 11/2009 |
| EP | 2339797 A1 | 6/2011 |
| WO | 2009073454 A1 | 6/2009 |

OTHER PUBLICATIONS

Foreign communication from a counterpart application, PCT Application PCT/CN2013/07434; International Search Report and Written Opinion, dated Oct. 17, 2013, 11 pages.
Foreign communication from a counterpart application, PCT Application PCT/CN2013/07434; English Translation International Search Report, dated Oct. 17, 2013, 3 pages.
CN Patent Application Publication 101163258 A, "Method and System for Processing High-Capacity Cell Broadcasting Service," published Apr. 16, 2008, Partial English Translation dated Apr. 29, 2014, 9 pages.
Montpetit, et al., "Network Coding Meets Information-Centric Networking: An Architectural Case for Information Dispersion Through Native Network Coding," NOM '12 Proceedings of the 1st ACM Workshop on Emerging Name-Oriented Mobile Networking Design—Architecture, Algorithms, and Applications, Jun. 6, 2012, pp. 31-36.
Li, et al., "Linear Network Coding," IEEE Transactions on Information Theory, vol. 49, No. 2, Feb. 2003, pp. 371-381.
Foreign Communication From a Counterpart Application, European Application No. 13810290.0, Extended European Search Report dated May 28, 2015, 7 pages.

* cited by examiner

CONTENT HANDLING METHOD, APPARATUS, AND SYSTEM

CROSS-REFERENCE TO RELATED APPLICATIONS

This application is a continuation of International Application No. PCT/CN 2013/078434, filed on Jun. 28, 2013, which claims priority to Chinese Patent Application No. 201210218512.6, filed on Jun. 28, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to communications technologies, and in particular, to a content handling method, apparatus, and system.

BACKGROUND

Unlike host-based network architecture, a content-centric network (CCN) is the content-based network architecture. In a CCN, a content of information is a "first-class entity" in network transmission, a name of the content replaces an Internet Protocol (IP) address, and a message is requested and transferred by using an Interest-Data message pair. Specifically, one content corresponds to one unique name. The content is divided into at least two content blocks, where different content blocks are stored in different CCN nodes. Routing and forwarding are performed based on a name of a content block. When a terminal needs to obtain a message of a content, the terminal may send multiple Interests to an intermediate router one by one to request content blocks of the content. If a node in the network stores a content block corresponding to the Interest, the node feeds back the content block to a content router through Data, and then the content router forwards the Data to the terminal. The terminal can recover the message corresponding to the content after obtaining all content blocks corresponding to the content.

In the prior art, each CCN node stores different content blocks of multiple different contents. However, it is also possible that the same content block of one content is stored on multiple different CCN nodes. Because each CCN node normally performs port range forwarding in a manner similar to broadcast when forwarding an Interest, multiple CCN nodes receiving the Interest and storing a content block requested by the Interest will all return the content block requested by the Interest, despite that only one content block is required. As can be seen, multiple CCN nodes return the same content block, which causes a bandwidth resource waste.

SUMMARY

Embodiments of the present invention provide a content releasing method, a content requesting method, an apparatus, and a system to solve the problem in the prior art that a bandwidth resource is seriously wasted because multiple CCN nodes return the same content block.

In a first aspect, an embodiment of the present invention provides a content requesting method, including: generating a content-requesting message, where the content-requesting message includes a name of a requested content, a request identifier, and excluded information; the request identifier is used to identify at least one requested coding block; and the excluded information includes an attribute field of an obtained coding block; and sending the content-requesting message to a CCN node to obtain the requested content; where the coding block is generated by performing linear coding on at least two content blocks with an equivalent size obtained by dividing the requested content, each coding block uniquely corresponds to one attribute identifier, and the attribute identifier includes the name and an attribute field of the requested content.

In another aspect, an embodiment of the present invention provides a message processing method, including: receiving a content-requesting message sent by a terminal, where the content-requesting message includes a name of a requested content, a request identifier, and excluded information; the request identifier is used to identify at least one requested coding block; and the excluded information includes an attribute field of an obtained coding block; determining coding block information corresponding to the requested content according to the name of the requested content and pre-stored coding block information, where the coding block information includes a coding block and an attribute identifier corresponding to the coding block; the coding block is generated by performing linear coding on at least two content blocks with an equivalent size obtained by dividing a content; and the attribute identifier includes a name and an attribute field of the content; performing an AND operation on the request identifier respectively with attribute fields in the coding block information corresponding to the requested content, and obtaining a coding block corresponding to an attribute field with which the AND operation produces a non-zero result and which is not part of the excluded information as a first target coding block; and sending a first content reply message to the terminal, where the first content reply message includes the first target coding block and the attribute field corresponding to the first target coding block.

In another aspect, an embodiment of the present invention provides a content releasing method, including: dividing a content into at least two content blocks with an equivalent size; performing linear coding on the at least two content blocks to generate more coding blocks than the content blocks, where each coding block uniquely corresponds to one attribute identifier; the attribute identifier includes a name and an attribute field of the content; and the attribute field is a coefficient vector formed in the linear coding process; and storing the multiple coding blocks and corresponding attribute identifiers in CCN nodes.

In another aspect, an embodiment of the present invention provides a terminal device, including: a request generating module configured to generate a content-requesting message, where the content-requesting message includes a name of a requested content, a request identifier, and excluded information; the request identifier is used to identify at least one requested coding block; and the excluded information includes an attribute field of an obtained coding block; and a request sending module configured to send the content-requesting message to a CCN node to obtain the requested content; where the coding block is generated by performing linear coding on at least two content blocks with an equivalent size obtained by dividing the requested content, each coding block uniquely corresponds to one attribute identifier, and the attribute identifier includes the name and an attribute field of the requested content.

In another aspect, an embodiment of the present invention provides a CCN node, including: a request receiving module configured to receive a content-requesting message sent by a terminal, where the content-requesting message includes a name of a requested content, a request identifier, and excluded information; the request identifier is used to identify at least one requested coding block; and the excluded information includes an attribute field of an obtained coding block; a searching module configured to determine coding block information corresponding to the requested content according to the name of the requested content and pre-stored coding block information, where the coding block information includes a coding block and an attribute identifier corresponding to the coding block; the coding block is generated by performing linear coding on at least two content blocks with an equivalent size obtained by dividing a content; and the attribute identifier includes a name and an attribute field of the content; an obtaining module configured to perform an AND operation on the request identifier respectively with attribute fields in the coding block information corresponding to the requested content, and obtain a coding block corresponding to an attribute field with which the AND operation produces a non-zero result and which is not part of the excluded information as a first target coding block; and a first sending module configured to send a first content reply message to the terminal, where the first content reply message includes the first target coding block and the attribute field corresponding to the first target coding block.

In another aspect, an embodiment of the present invention provides a content releasing apparatus, including: a dividing module configured to divide a content into at least two content blocks with an equivalent size; a linear coding module configured to perform linear coding on the at least two content blocks to generate more coding blocks than the content blocks, where each coding block uniquely corresponds to one attribute identifier; the attribute identifier includes a name and an attribute field of the content; and the attribute field is a coefficient vector formed in the linear coding process; and a storing module configured to store the multiple coding blocks and corresponding attribute identifiers in CCN nodes.

In another aspect, an embodiment of the present invention provides a CCN system, including multiple CCN nodes, where each CCN node is any one of the CCN nodes described above.

The content releasing method, the content requesting method, the apparatus, and the system according to the present invention may convert at least two content blocks with an equivalent size of the same content into coding blocks by performing linear coding, and release the coding blocks to CCN nodes, so that a terminal obtains required coding blocks by requesting the coding blocks and performing an AND operation on an identifier in a content-requesting message respectively with an attribute field of the coding blocks. This reduces the probability that the nodes return the same coding block according to the request, thereby helping to improve bandwidth utilization.

BRIEF DESCRIPTION OF THE DRAWINGS

To illustrate the technical solutions in the embodiments of the present invention more clearly, the following briefly introduces the accompanying drawings required for describing the embodiments. The accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
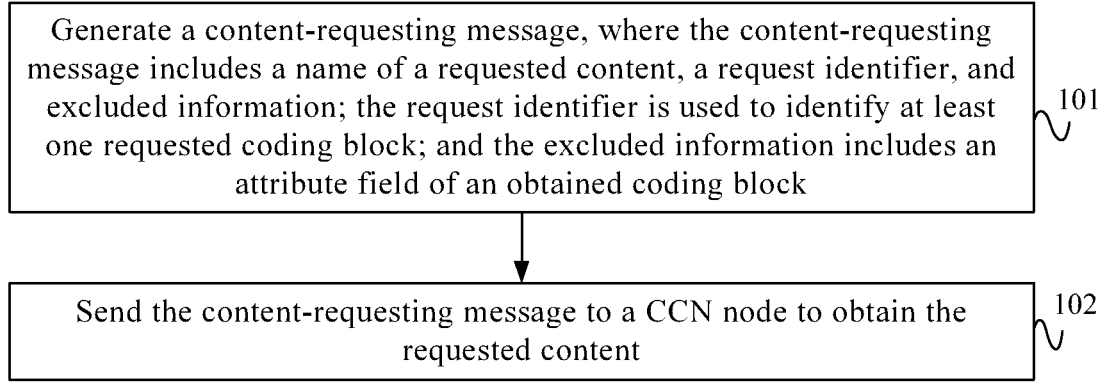
FIG. 1 is a flowchart of a content requesting method according to an embodiment of the present invention.

FIG. 1 is a flowchart of a content requesting method according to an embodiment of the present invention. As shown in FIG. 1, the content requesting method according to the embodiment includes:

Step 101: Generate a content-requesting message, where the content-requesting message includes a name of a requested content, a request identifier, and excluded information; the request identifier is used to identify at least one requested coding block; the excluded information includes an attribute field of an obtained coding block. That is, the content-requesting message is used to request a coding block which is required to form the requested content and is not obtained.

Step 102: Send the content-requesting message to a CCN node to obtain the requested content.

The coding block is generated by performing linear coding on at least two content blocks with an equivalent size obtained by dividing the requested content, each coding block uniquely corresponds to one attribute identifier, and the attribute identifier includes the name and an attribute field of the requested content.

Further, the request identifier may further be linearly independent of the attribute field of the obtained coding block.

The embodiment may be executed by a terminal.

In the content requesting method according to the embodiment, a required coding block may be required from nodes having coding blocks stored in a CCN, thereby obtaining the requested content. Because the coding blocks outnumber the content blocks of the content, the probability that the nodes return the same coding block may be reduced, thereby helping to save a bandwidth resource.

Further, the request identifier may be a binary sequence, where the total number of bits of the binary sequence equals the number of the content blocks. To obtain an $i^{th}$ content block of the requested content, an $i^{th}$ bit of the binary sequence is set to 1 and other bits are set to 0.

Specifically, if the requested content includes four content blocks, the request identifier may be a 4-bit binary sequence, and "1000", "0100", "0010", and "0001" may respectively represent a first content block, a second content block, a third content block, and a fourth content block of the requested content.

In addition, the request identifier may be used to implement a batch request. For example, a request identifier "0111" in a content-requesting message may indicate that a current request is used to request a second content block, a third content block, and a fourth content block of the requested content. That is, one content-requesting message is used to request multiple blocks of the requested content, which reduces the times of sending content-requesting messages, thereby further improving transmission efficiency.

Further, after the sending the content-requesting message to a CCN node, the method may further include: receiving a content reply message sent by the CCN node, where the content reply message includes a target coding block and an attribute identifier corresponding to the target coding block, and the target coding block is a coding block where a result of an AND operation performed on an attribute field thereof with the request identifier is non-zero and the attribute field is not part of the excluded information.

Specifically, after receiving the content-requesting message sent by the terminal, a CCN node performs an AND operation on the request identifier of the content-requesting message respectively with attribute fields of coding blocks stored in the node and corresponding to the requested content, obtains a coding block corresponding to an attribute field with which the AND operation produces a non-zero result and which is not part of the excluded information in the content-requesting message as a first target coding block. Or the CCN node receives a target coding block and an attribute field of the target coding block returned by a downstream node thereof, and forwards the target coding block and the attribute field of the target coding block to the terminal. When no target coding block exists on the CCN node, the CCN node will send the content-requesting message sent by the terminal to the downstream node thereof, so as to request the target coding block from the downstream node thereof. The downstream node of the CCN node obtains the target coding block according to the content-requesting message in the same manner as the CCN node, which will not be described repeatedly herein. It should be noted herein that a target coding block locally obtained by the CCN node may be different from the target coding block returned by the downstream node of the CCN node.

Optionally, the content requesting method may further include: normalizing all obtained coding blocks to determine a request identifier and excluded information that are required for a next content-requesting message; that is, normalizing an attribute matrix formed by the attribute fields respectively included in all obtained coding blocks to determine a request identifier of a next content-requesting message to be sent, and writing the attribute fields respectively corresponding to all obtained coding blocks into the excluded information.

The content-requesting message may further include a type identifier of the linear coding, where the type identifier may correspond to a linear coding manner used by the coding block. Hence, when receiving the content-requesting message, the CCN node may learn, according to the type identifier, that the terminal requests a linear coding block, so as to perform a handling process (that is, perform an AND operation on the request identifier respectively with an attribute field of a stored coding block) for a linear coding block when the CCN node stores linear coding blocks of different linear coding types at the same time or stores linear coding blocks and non-linear coding content blocks at the same time, thereby obtaining the requested target coding block of the linear coding manner; when the content-requesting message requests a non-linear coding content block, processing does not need to be performed according to the handling process for the linear coding, and processing is performed directly in a manner using the requested content name and the content serial number in the prior art, which further improves capability of the content requesting method to suit the CCN architecture of the prior art.

Figure 2:
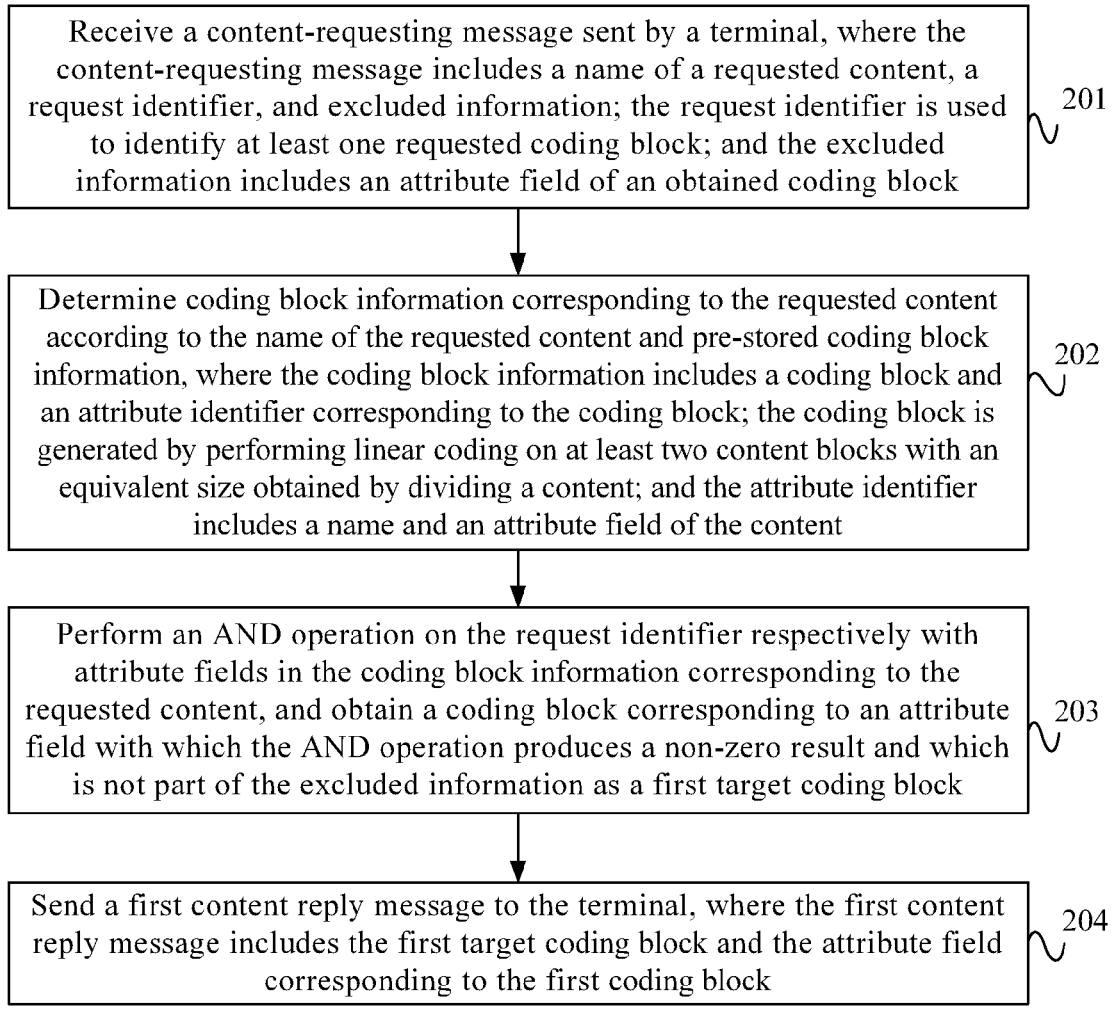
FIG. 2 is a flowchart of a message processing method according to an embodiment of the present invention.

FIG. 2 is a flowchart of a message processing method according to an embodiment of the present invention. As shown in FIG. 2, the message processing method according to the embodiment includes:

Step 201: Receive a content-requesting message sent by a terminal, where the content-requesting message includes a name of a requested content, a request identifier, and excluded information; the request identifier is used to identify at least one requested coding block; and the excluded information includes an attribute field of an obtained coding block.

Step 202: Determine coding block information corresponding to the requested content according to the name of the requested content and pre-stored coding block information, where the coding block information includes a coding block and an attribute identifier corresponding to the coding block; the coding block is generated by performing linear coding on at least two content blocks with an equivalent size obtained by dividing a content; and the attribute identifier includes a name and an attribute field of the content.

The coding block information may be stored in a node as a content store (CS) table, where a specific content thereof may be a mapping relationship between a coding block and an attribute identifier of the coding block. After receiving the content-requesting message, the node may search the CS table according to the name of the requested content therein to obtain all coding block information corresponding to the name of the requested content.

Step 203: Perform an AND operation on the request identifier respectively with attribute fields in the coding block information corresponding to the requested content, and obtain a coding block corresponding to an attribute field with which the AND operation produces a non-zero result and which is not part of the excluded information as a first target coding block. Specifically, an AND operation is performed on the request identifier respectively with the attribute fields of the coding blocks corresponding to the name of the requested content; when a result is non-zero, indicating that the attribute field of the coding block is linearly independent of the request identifier, and when the coding block is not part of obtained coding blocks of the terminal, the coding block is the first target coding block corresponding to the content-requesting message.

Step 204: Send a first content reply message to the terminal, where the first content reply message includes the first target coding block and the attribute field corresponding to the first target coding block. Indeed, the first content reply message may further include other information such as the name of the requested content. If one attribute field with which the AND operation produces a non-zero result and which is not part of the excluded information is obtained, the coding block corresponding to the attribute field is included in the first content reply message and sent to the terminal; if multiple attribute fields with which the AND operation produces a non-zero result and which are not part of the excluded information are obtained, one is randomly selected from the attribute fields, and a coding block corresponding to the selected attribute field is used as the first target coding block, or a coding block corresponding to an attribute field having a minimum operation result is used as the first target coding block.

The embodiment may be executed by a CCN node.

In the message processing method according to the embodiment, an AND operation is performed on the request identifier of the content-requesting message with the attribute fields in the coding block information corresponding to the name of the requested content, and the coding block with which the AND operation produces a non-zero result is used as the target coding block and returned to the corresponding terminal, so that the terminal may obtain multiple linearly independent coding blocks corresponding to the content requested thereby, and recover, by performing linear decoding on the coding blocks and by using the attribute fields, the content corresponding to the name of the content requested thereby. Because the coding blocks formed by linear coding outnumber the content blocks, the probability that each CCN node returns the same target coding block is reduced, thereby helping to improve bandwidth utilization and helping to improve transmission efficiency.

Further, when no attribute field with which the AND operation produces a non-zero result is obtained, or all obtained attribute fields with which the AND operation produces a non-zero result are part of the excluded information, the content-requesting message is forwarded. For example, the content-requesting message may be forwarded to other corresponding nodes according to a forward information base (FIB), and receiving and sending information corresponding to the content-requesting message may be added to a pending interest table (PIT).

The FIB may record a corresponding relationship between the name of the requested content and a next destination port, and the PIT may record a corresponding relationship between the content-requesting message and the receiving and sending information, where the receiving and sending information refers to a port from which the content-requesting message is received and the next destination port to which the content-requesting message is sent.

Then, a second content reply message corresponding to the content-requesting message may further be received, where the second content reply message includes a second target coding block and an attribute field corresponding to the second target coding block; and the second target coding block and the attribute field corresponding to the second target coding block is a coding block obtained by another CCN node according to the content-requesting message and similarly, corresponding to an attribute field with which the AND operation performed on the request identifier produces a non-zero result and which is not part of the excluded information.

If the receiving and sending information corresponding to the content-requesting message still exists in the PIT when the second content reply message is received, the second content reply message is sent to the terminal.

Based on the above description, the method may further include: deleting the receiving and sending information corresponding to the content-requesting message from the PIT.

Optionally, the method may further include: if the receiving and sending information corresponding to the content-requesting message no longer exists in the PIT when the second content reply message is received, performing an AND operation on the attribute field corresponding to the second target coding block respectively with the attribute fields in the coding block information, and when all AND operation results are non-zero, adding the second target coding block and the attribute field corresponding to the second target coding block to the coding block information; that is, if the node has received and forwarded the second content reply message sent by another node and has deleted the receiving and sending information of the corresponding content-requesting message from the PIT; or if the receiving and sending information corresponding to the content-requesting message corresponding to the second content reply message in the PIT is cleared because valid time of its storage expires, so that the node currently does not contain the content-requesting message for requesting the second content reply message, adding the second target coding block and the attribute field corresponding thereto in the second content reply message to the coding block information stored in the CS, so that when receiving a content-requesting message matching the second target coding block later, the node directly returns the second target coding block to a corresponding terminal.

Figure 3:
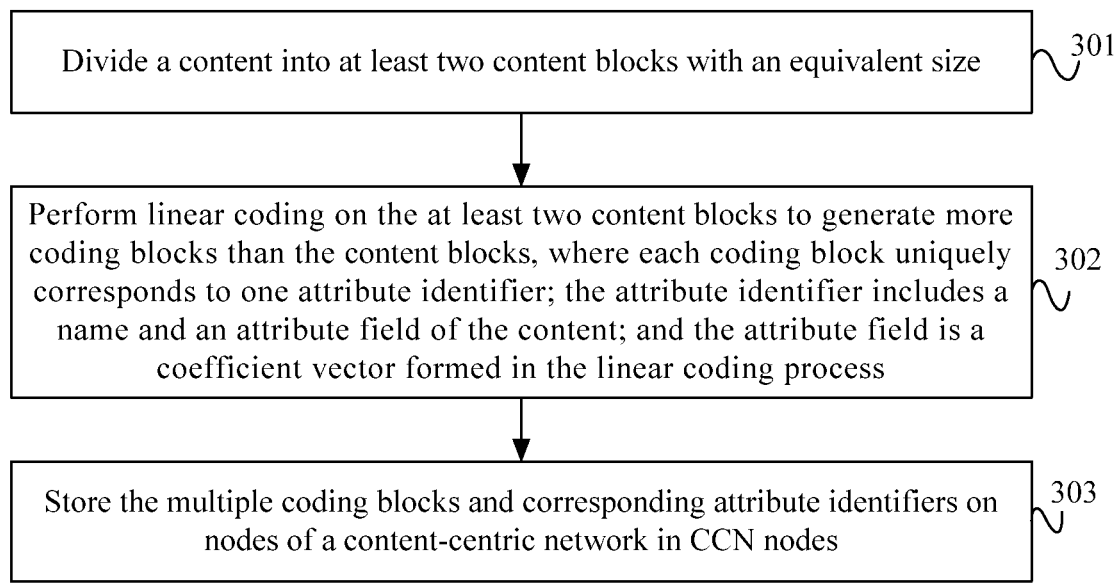
FIG. 3 is a flowchart of a content releasing method according to an embodiment of the present invention.

FIG. 3 is a flowchart of a content releasing method according to an embodiment of the present invention. As shown in FIG. 3, the content releasing method according to the embodiment includes:

Step 301: Divide a content into at least two content blocks with an equivalent size.

Step 302: Perform linear coding on the at least two content blocks to generate more coding blocks than the content blocks, where each coding block uniquely corresponds to one attribute identifier; the attribute identifier includes a name and an attribute field of the content; and the attribute field is a coefficient vector formed in the linear coding process.

Step 303. Store the multiple coding blocks and corresponding attribute identifiers in CCN nodes.

Optionally, the multiple coding blocks may be respectively stored in different nodes, or a combination of several coding blocks may be stored on the same node, which is not specifically limited in the present invention.

Optionally, the attribute identifier may further include: a type identifier of the linear coding, so that the terminal recovers the corresponding content block according to the type of the linear coding and the coding block.

The embodiment may be executed by a terminal or a CCN node.

In the content releasing method according to the embodiment, more than two content blocks with an equivalent size of the same content may be converted into coding blocks by performing linear coding, and the coding blocks may be released to the CCN nodes, so that the terminal may obtain the required coding blocks by requesting the coding blocks. Because the coding blocks obtained by performing linear coding outnumber the content blocks, the probability that each node returns the same coding block according to the request is reduced, thereby improving bandwidth utilization.

Figure 4A:
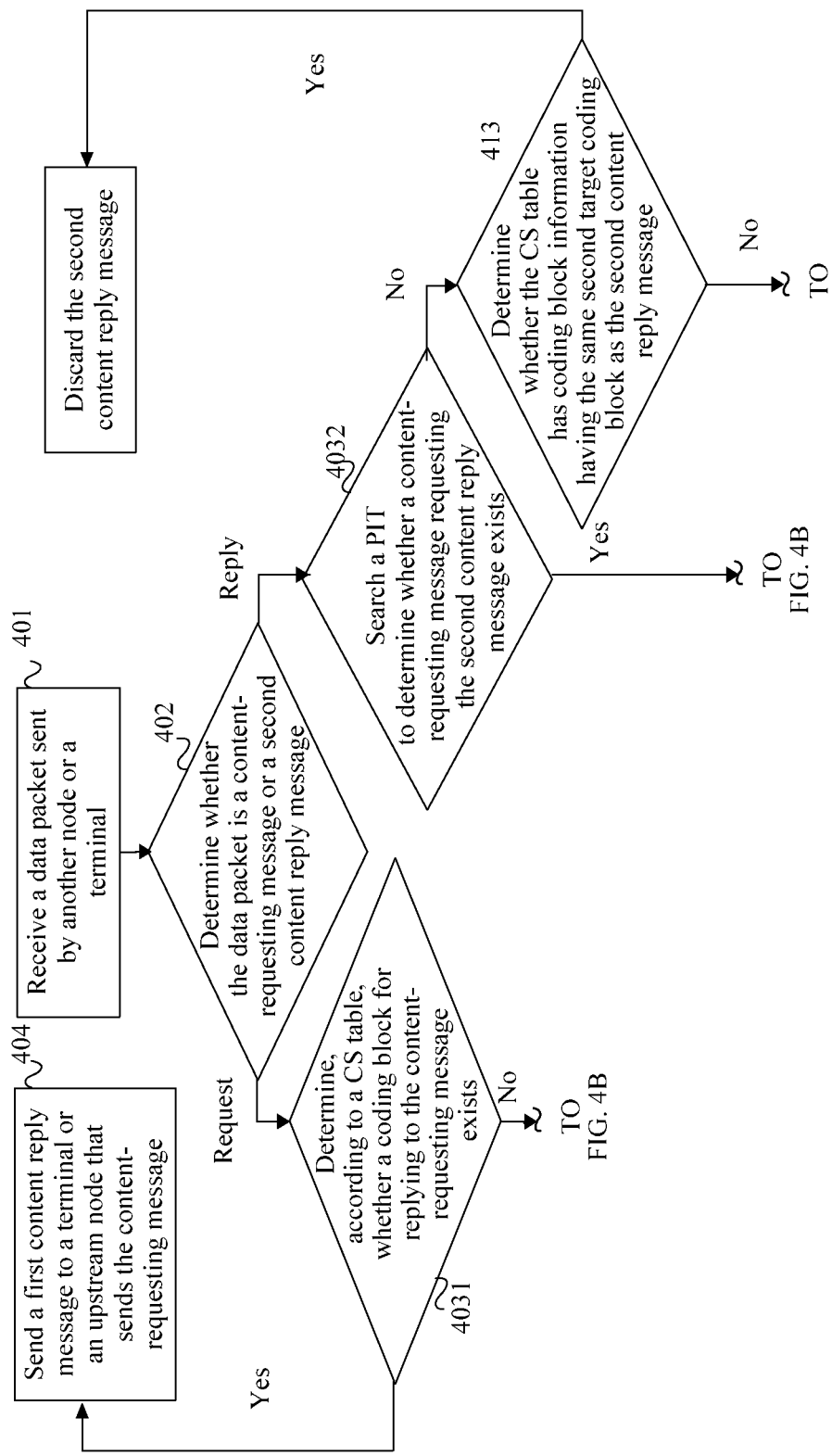
FIG. 4A and FIG. 4B are a flowchart of a message processing method according to another embodiment of the present invention.
Figure 4B:
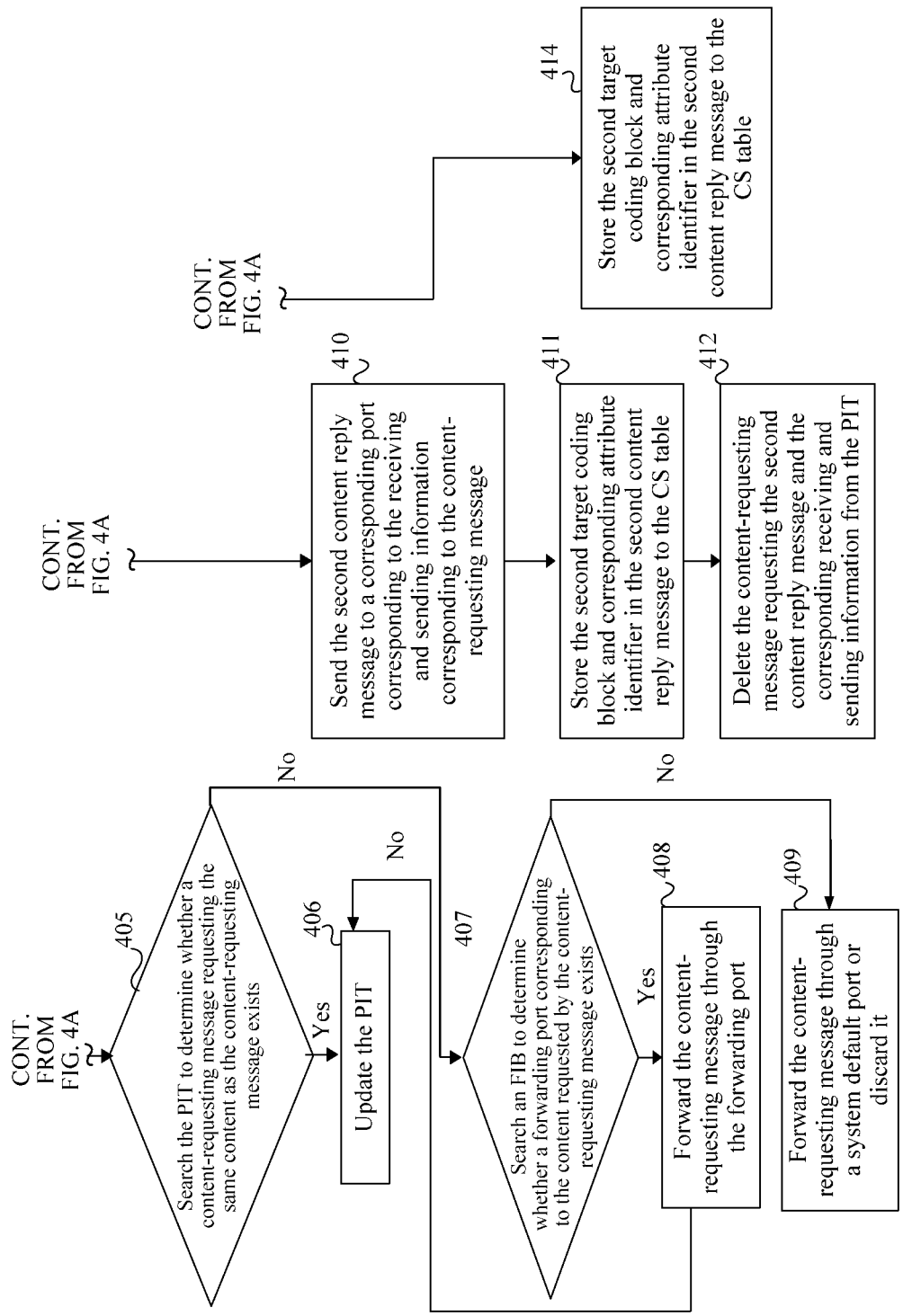

FIG. 4A and FIG. 4B are a flowchart of a message processing method according to another embodiment of the present invention. The embodiment, by using an example where a node receives a content-requesting message requesting a linear coding block in a case where a CCN node stores coding blocks, further describes in detail the detailed process in which the CCN nodes process a received message. In the embodiment, the coding blocks are generated by performing linear coding on at least two content blocks obtained by evenly dividing the requested content, where each coding block uniquely corresponds to one attribute identifier; the attribute identifier includes a name and an attribute field of the requested content; the content-requesting message includes the name of the requested content, a request identifier, and excluded information; the request identifier is used to identify a requested coding block; and the excluded information includes an attribute field of an obtained coding block. As shown in FIG. 4, the method according to the embodiment may include:

Step 401: A node receives a data packet sent by another node or a terminal.

Step 402: Determine whether the data packet is a content-requesting message or a second content reply message according to information carried by the data packet; execute step 4031 if determining that the data packet is a content-requesting message; and execute step 4032 if determining that the data packet is a second content reply message.

Step 4031: When the data packet is a content-requesting message, determine, according to coding block information in a CS, whether a coding block for replying to the content-requesting message exists. Specifically, the CS may be searched according to a name of the requested content for coding block information corresponding to the requested content, where the coding block information includes a coding block and an attribute identifier corresponding to the coding block; the coding block is generated by performing linear coding on at least two content blocks obtained by dividing the same content; and the attribute identifier includes a name and an attribute field of the content. Then, an AND operation is performed on the request identifier of the content-requesting message respectively with attribute fields in the coding block information corresponding to the requested content, and when a coding block with which the AND operation produces a non-zero result exists, it is deemed that a first target coding block for replying to the content-requesting message exists.

Step 404: When the coding block for replying to the content-requesting message exists in the CS table, send a first content reply message to the terminal or the upstream node that sends the content-requesting message, where the first content reply message includes the first target coding block determined in step 4031.

Step 405: When no coding block for replying to the content-requesting message exists in the CS table, search a PIT to determine whether a content-requesting message requesting the same content as the content-requesting message exists; and if yes, execute step 406; if not, execute step 407.

Step 406: Update the PIT; that is, store receiving and sending information corresponding to the received content-requesting message to the PIT, so that the PIT contains receiving and sending information respectively corresponding to all content-requesting messages that fail to obtain a target coding block from the CS table of the node.

Step 407: Search an FIB to determine whether a forwarding port corresponding to the content requested by the content-requesting message exists; and if yes, execute step 408; if not, execute step 409.

Step 408: Forward the content-requesting message through the forwarding port determined in step 407.

Step 409: Forward the content-requesting message through a system default port or discard it.

Step 4032: When determining that the data packet is a second content reply message, search the PIT to determine whether a content-requesting message requesting the second content reply message exists; and if yes, execute step 410; if not, execute step 413. Specifically, the determining whether the content-requesting message requesting the second content reply message exists may be: performing an AND operation on an attribute field corresponding to a second target coding block in the second content reply message respectively with request identifiers of content-requesting messages stored in the PIT, and when an operation result is non-zero, determining that a content-requesting message corresponding to the request identifier requests the second content reply message.

Step 410: Send the second content reply message to the corresponding port according to the receiving and sending information corresponding to the content-requesting message requesting the second content reply message, so as to send the second content reply message to the upstream node or the terminal sending the content-requesting message.

Step 411: Store the second target coding block and the corresponding attribute identifier in the second content reply message to the CS table, so as to supplement the coding block information in the CS table.

Step 412: Delete the content-requesting message requesting the second content reply message and the corresponding receiving and sending information from the PIT.

Step 413: Determine whether the CS table has coding block information having the same second target coding block as that in the second content reply message according to the coding block information pre-stored in the CS table; if yes, discard the second content reply message; if not, execute step 414.

Step 414: Store the second target coding block and the corresponding attribute identifier in the second content reply message to the CS table, so as to supplement the coding block information in the CS table, and then end the operation.

The determining whether the CS table has the coding block information having the same second target coding block as that in the second content reply message may specifically be: performing an AND operation on the attribute field corresponding to the second target coding block respectively with attribute fields in the coding block information in the CS table, and when all AND operation results are non-zero, determining that the CS table does not have the coding block information having the same second target coding block.

In the message processing method according to the embodiment, an AND operation is performed on the request identifier in the content-requesting message respectively with attribute fields in the pre-stored coding block information, and a coding block with which the AND operation produces a non-zero result is used as the first target coding block, which ensures that the first target coding blocks are linearly independent of each other for a sender of the content-requesting message, reduces the probability of obtaining coding blocks of the same content block, and improves bandwidth utilization. Moreover, in the embodiment, an AND operation is performed on the attribute field corresponding to the second target coding block in the second content reply message respectively with the attribute fields of the pre-stored coding block information, and when the AND operation produces a non-zero result, the second target coding block and corresponding attribute field in the second content reply message are stored, so that when receiving a next content-requesting message requesting the second target coding block, the node directly includes the second target coding block in a first content reply message and returns it to a node or a terminal sending the content-requesting message, which skips a process where the node forwards the content-requesting message to another node to obtain the second target coding block, thereby improving transmission efficiency.

Figure 5:
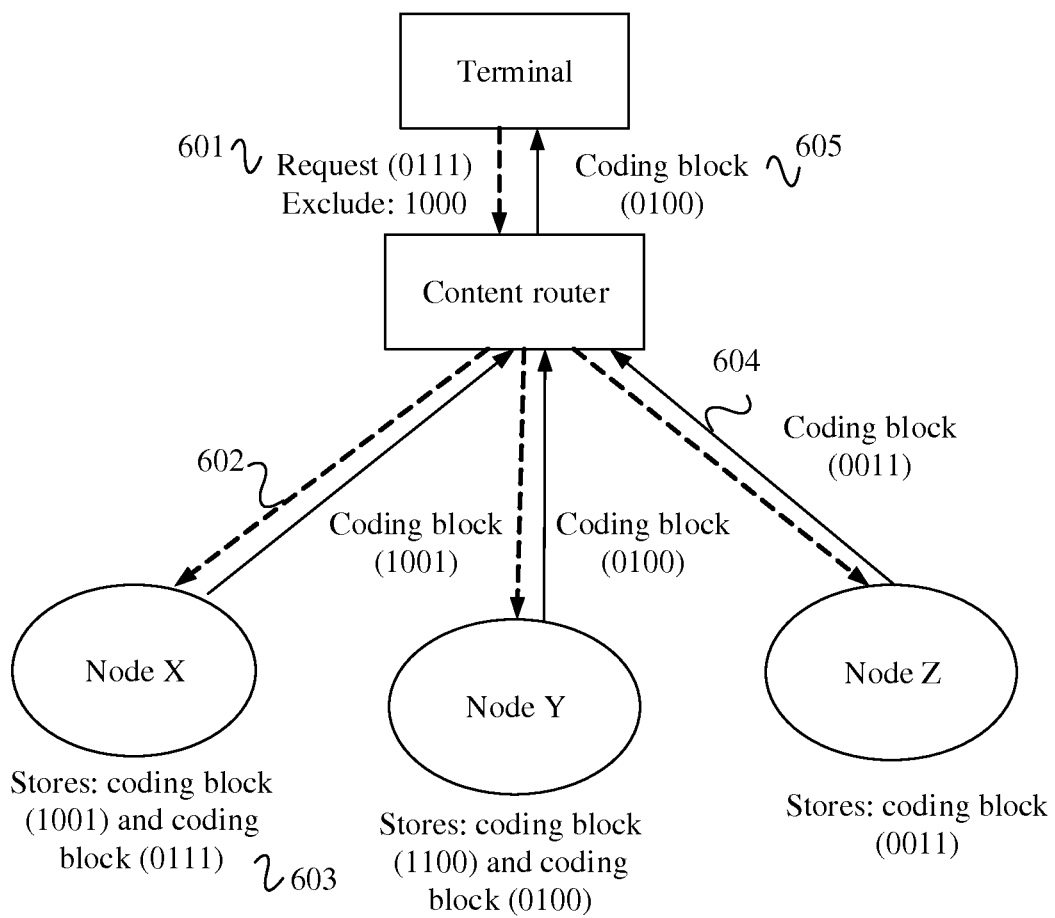
FIG. 5 is a schematic diagram illustrating an interaction process among nodes after a terminal sends a content-requesting message to a CCN.

Another embodiment of the present invention, by using an example where a terminal sends a request for four content blocks of a content, further describes the content requesting method and the message processing method according to the present invention. It should be noted that in CCN architecture, each node has the capability of processing a message; however, for the convenience of understanding, a node directly receiving a content-requesting message of a terminal may be used as a content router, and a node storing a coding block requested by the content-requesting message is used as a target node. In the embodiment, the CCN nodes stores coding blocks which are formed by performing linear coding on four content blocks and outnumber the original content blocks, where each coding block uniquely corresponds to one attribute identifier, which may be: content name-NC/attribute field or content name/NC/attribute field, where NC is a type identifier of the linear coding; the attribute field is a coefficient vector used when performing linear coding on the content blocks. Because there are four content blocks, the coefficient vector is a 4-bit binary sequence. More specifically, in the embodiment, the terminal has obtained coding blocks corresponding to a first content block, and needs to continue to obtain coding blocks respectively corresponding to second to fourth content blocks. Currently, only a node X, a node Y, and a node Z respectively stores coding blocks having the same content name; two coding blocks in the node X respectively correspond to attribute fields "1001" and "0111"; two coding blocks in the node Y respectively correspond to attribute fields "1100" and "0100"; and one coding block in the node Z corresponds to an attribute field "0011". As shown in FIG. 5, a content in a bracket following a coding block represents an attribute field corresponding to the coding block.

Step 601: The terminal sends a content-requesting message to the content router, where the content-requesting message includes a name of a requested content, a request identifier, and excluded information. In this case, the request identifier may be a binary sequence "0111" for requesting coding blocks corresponding to the second, third, and fourth content block in a batch; the excluded information includes an attribute field of an obtained coding block to exclude obtained coding blocks corresponding to the first content block.

Alternatively, only one coding block is requested each time may also be used. For example, "0100" is used as the request identifier to request a coding block corresponding to the second content block.

Step 602: The content router forwards the content-requesting message to other nodes, that is, the node X, the node Y, and the node Z, in a broadcast way. In a specific scenario of the embodiment, because the node functioning as the content router stores no coding block of the same content name, the content router directly forwards the content-requesting message to next-layer nodes.

Step 603: After receiving the content-requesting message, the node X, the node Y, and the node Z respectively determine coding block information corresponding to the content name in a CS table according to the content name in the content-requesting message, and then perform an AND operation on the request identifier respectively with attribute fields in the coding block information one by one, where operation results may indicate that a coding block having an attribute field "1001" in the node X may be used as a second target coding block, a coding block having an attribute field "0100" in the node Y may be used as a second target coding block, and a coding block having an attribute field "0011" in the node Z may be used a second target coding block; then, respectively send the three second target coding blocks and attribute fields respectively corresponding to the second target coding blocks to the content router through second content reply messages. The process is illustrated in FIG. 5. Specifically, in FIG. 5, a dashed line indicates a requesting process, and a solid line indicates a reply process for the request.

Step 604: The content router receives the second content reply messages, where at this moment, receiving and sending information corresponding to the content-requesting message still exists in a PIT; and uses one (for example, "0100") of the three second target coding blocks as a first target coding block, and includes the first target coding block and a corresponding attribute field in a first content reply message and returns the first content reply message to the terminal. Preferably, the content router uses the second target coding block (for example, "0100") that is received first as the first target coding block.

Step 605: The terminal receives the first content reply message, obtains the first target coding block therefrom, normalizes the two received coding blocks ("1000" and "0100"), and then sends a content-requesting message for requesting coding blocks corresponding to the third and fourth content blocks, where a request identifier may be "0011", and excluded information may be "1000" and "0100".

Figure 6:
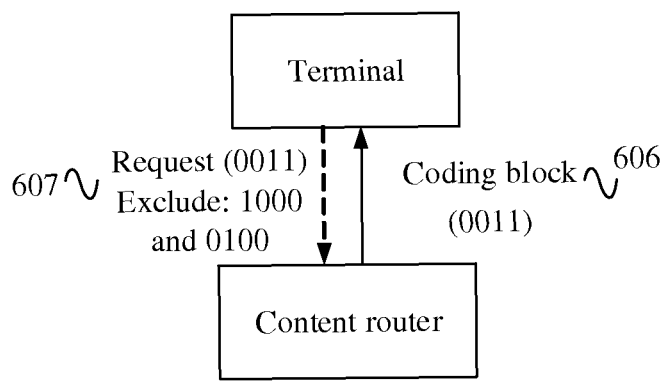
FIG. 6 is a schematic diagram illustrating an interaction process where a node continues to send a content-requesting message after the processing illustrated in FIG. 5.
Figure 6:
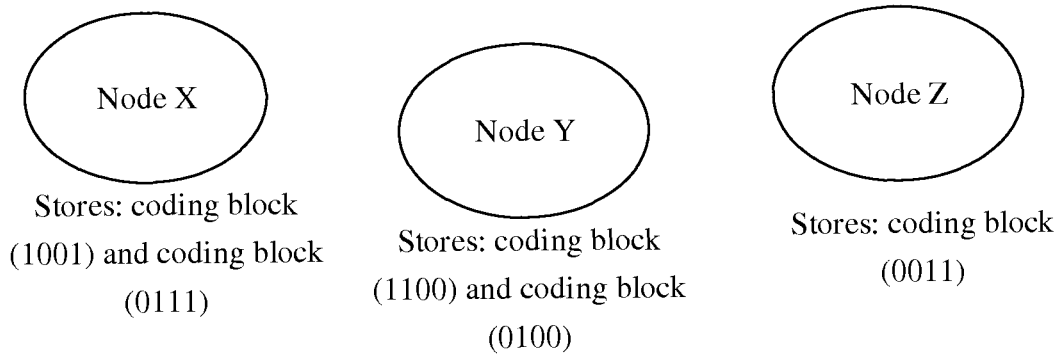

Step 606: After receiving the content-requesting message requesting the coding blocks corresponding to the third and fourth content blocks, the content router performs an AND operation on the request identifier therein respectively with attribute fields of coding block information having the same content name stored in the CS table, and uses those with which the AND operation produces a non-zero result as a target coding block. In such cases, "0011" and "1001" described above satisfy the requirements. Therefore, a coding block corresponding to a smaller operation result, that is, "0011", is selected as the first target coding block and is returned to the terminal by using a first content reply message. The process is illustrated in FIG. 6. Specifically, in FIG. 6, a dashed line represents a request process, and a solid line represents a reply process for the request. Moreover, no connecting line is shown between the content router and the node X, the node Y, and the node Z; however, this does not indicate that the content router is not connected to the nodes, but indicates that no data transmission is performed in this process.

Step 607: After receiving the first content reply message and obtaining the first target coding block therefrom, the terminal may send a content-requesting message for requesting coding blocks corresponding to the third and fourth content blocks, where a request identifier may be "0011", and excluded information may be "1000", "0100", and "0011".

Figure 7:
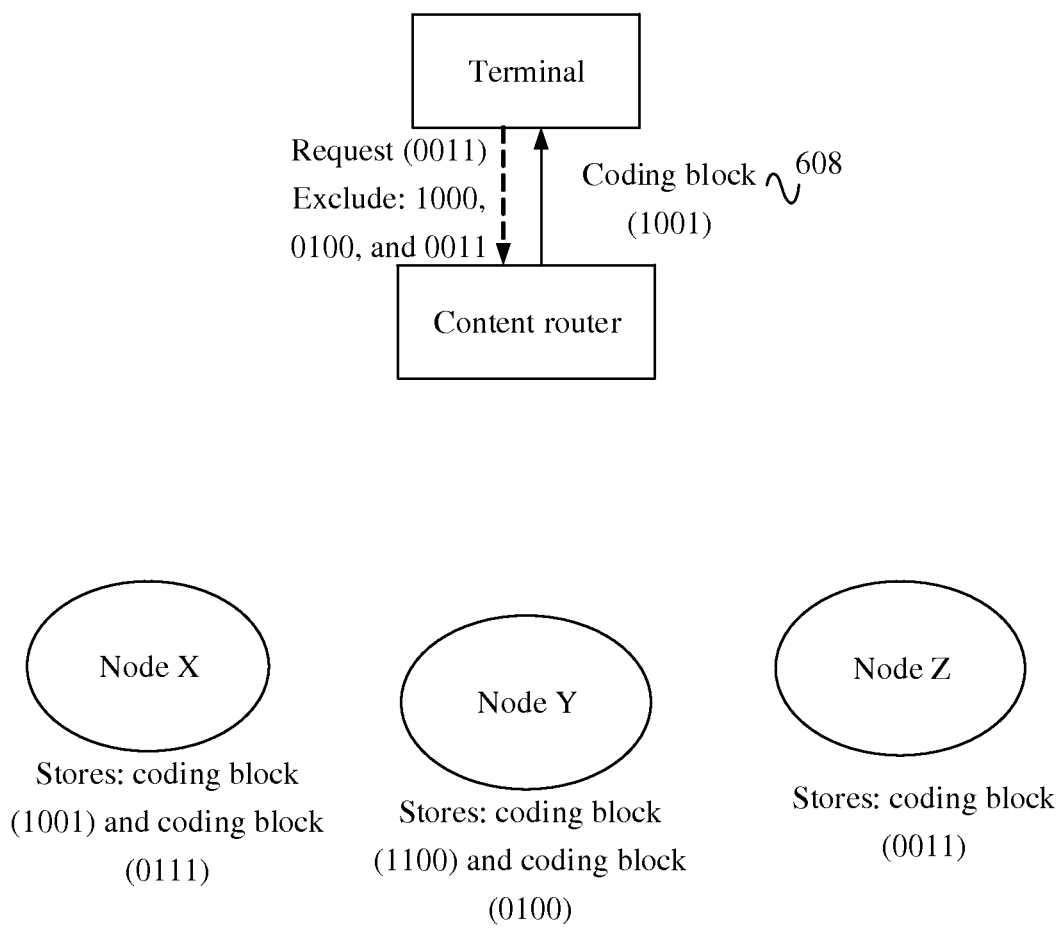
FIG. 7 is a schematic diagram illustrating an interaction process where a node continues to send a content-requesting message after the processing illustrated in FIG. 6.

Step 608: After receiving the content-requesting message requesting the third and fourth content blocks, the content router performs an AND operation on the request identifier therein respectively with attribute fields of coding block information having the same content name stored in the CS table, and uses those with which the AND operation produces a non-zero result as a target coding block. In such cases, only "1001" satisfies the requirements. Therefore, a coding block corresponding to "1001" is used as the first target coding block and returned to the terminal. The process is illustrated in FIG. 7. Specifically, in FIG. 7, a dashed line represents a request process, and a solid line represents a reply process for the request. Moreover, no connecting line is shown between the router and the node X, the node Y, and the node Z; however, this does not indicate that the content router is not connected to the nodes, but indicates that no data transmission is performed in this process.

As can be seen from the embodiment, there is a high probability that attribute fields of coding blocks returned by the nodes to the content router are linearly independent of each other; moreover, different coding blocks obtained by using a batch request may be stored in the content router, so that a next content-requesting message for requesting the coding blocks of the terminal may obtain the corresponding first content reply message in the content router instead of being forwarded to a next-layer node, thereby helping to improve transmission efficiency while improving bandwidth utilization.

Figure 8:
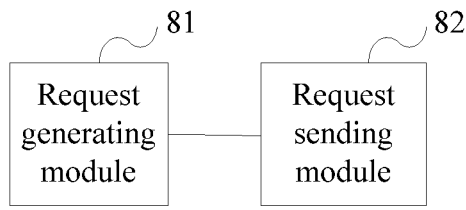
FIG. 8 is a schematic structural diagram of a terminal device according to an embodiment of the present invention.

FIG. 8 is a schematic structural diagram of a terminal device according to an embodiment of the present invention. As shown in FIG. 8, the terminal device according to the embodiment includes: a request generating module 81 configured to generate a content-requesting message, where the content-requesting message includes a name of a requested content, a request identifier, and excluded information; the request identifier is used to identify at least one requested coding block; and the excluded information includes an attribute field of an obtained coding block; and a request sending module 82 configured to send the content-requesting message to a CCN node to obtain the requested content; where the coding block is generated by performing linear coding on at least two content blocks with an equivalent size obtained by dividing the requested content, each coding block uniquely corresponds to one attribute identifier, and the attribute identifier includes a name and an attribute field of the requested content.

Figure 9A:
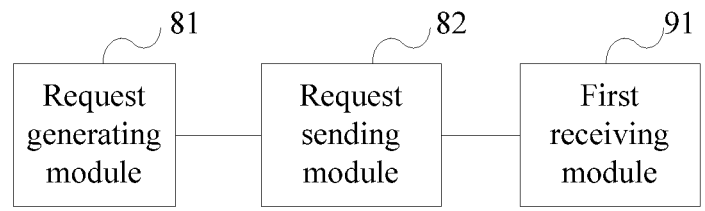
FIG. 9A is a schematic structural diagram of a terminal device according to another embodiment of the present invention.

FIG. 9A is a schematic structural diagram of a terminal device according to another embodiment of the present invention. As shown in FIG. 9A, on the basis of the structure illustrated in FIG. 8, the terminal device according to the embodiment further includes: a first receiving module 91 configured to receive a content reply message sent by the CCN node, where the content reply message includes a target coding block and an attribute identifier corresponding to the target coding block, and the target coding block is a coding block where a result of an AND operation performed on an attribute field thereof with the request identifier is non-zero and the attribute field is not part of the excluded information.

Figure 9B:
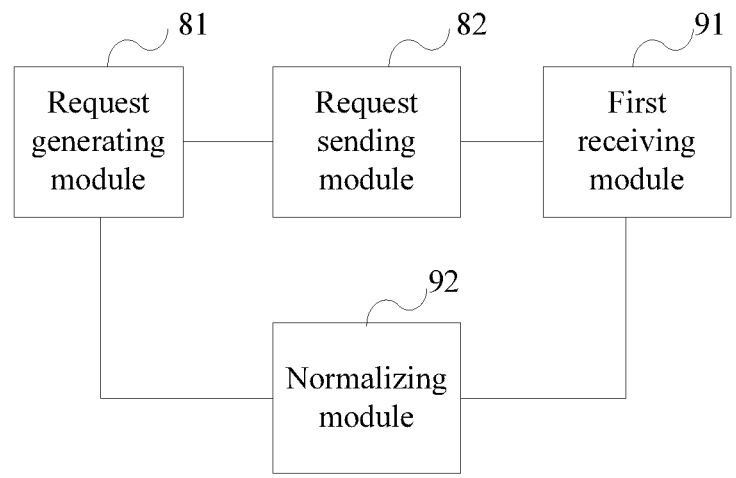
FIG. 9B is a schematic structural diagram of a terminal device according to another embodiment of the present invention.

FIG. 9B is a schematic structural diagram of a terminal device according to another embodiment of the present invention. As shown in FIG. 9B, on the basis of the structure illustrated in FIG. 9A, the terminal device according to the embodiment further includes: a normalizing module 92 configured to normalize all obtained coding blocks to determine a request identifier and excluded information that are required for a next content-requesting message.

The terminal device according to the foregoing embodiments may be used to execute the content requesting method described in the foregoing embodiments, where the implementation principle and technical effects are similar, and will not be described repeatedly herein.

The terminal device according to the embodiment may send a content-requesting message to request a required coding block from nodes having coding blocks stored in a CCN, thereby obtaining the requested content. Because the coding blocks outnumber the content blocks of the content, the probability that each node returns the same coding block may be reduced, which improves bandwidth utilization.

Figure 10:
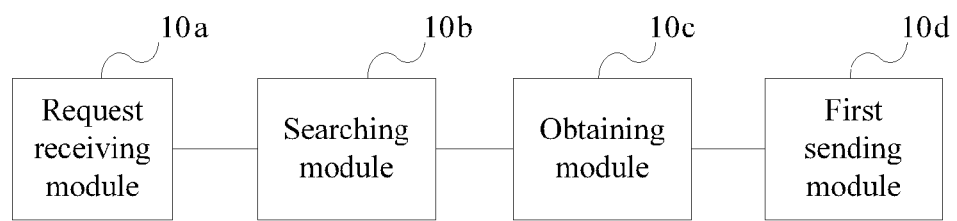
FIG. 10 is a schematic structural diagram of a CCN node according to an embodiment of the present invention.

FIG. 10 is a schematic structural diagram of a CCN node according to an embodiment of the present invention. As shown in FIG. 10, the CCN node according to the embodiment includes: a request receiving module 10a configured to receive a content-requesting message sent by a terminal, where the content-requesting message includes a name of a requested content, a request identifier, and excluded information; the request identifier is used to identify at least one requested coding block; and the excluded information includes an attribute field of an obtained coding block; and a searching module 10b configured to determine coding block information corresponding to the requested content according to the name of the requested content and pre-stored coding block information, where the coding block information includes a coding block and an attribute identifier corresponding to the coding block; the coding block is generated by performing linear coding on at least two content blocks with an equivalent size obtained by dividing a content; and the attribute identifier includes a name and an attribute field of the content; an obtaining module 10c configured to perform an AND operation on the request identifier respectively with attribute fields in the coding block information corresponding to the requested content, and obtain a coding block corresponding to an attribute field with which the AND operation produces a non-zero result and which is not part of the excluded information as a first target coding block; and a first sending module 10d configured to send a first content reply message to the terminal, where the first content reply message includes the first target coding block and the attribute field corresponding to the first target coding block.

Figure 11:
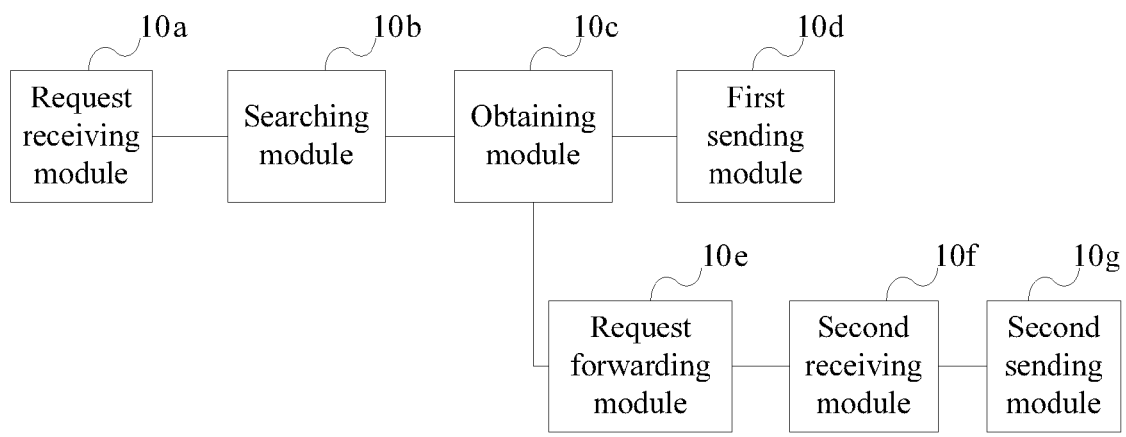
FIG. 11 is a schematic structural diagram of a CCN node according to another embodiment of the present invention.

FIG. 11 is a schematic structural diagram of a CCN node according to another embodiment of the present invention. As shown in FIG. 11, on the basis of the structure illustrated in FIG. 10, the CCN node according to the embodiment further includes: a request forwarding module 10e configured to: when no attribute field with which the AND operation produces a non-zero result is obtained, or obtained attribute fields with which the AND operation produces a non-zero result are part of the excluded information, forward the content-requesting message and add receiving and sending information corresponding to the content-requesting message to a PIT; a second receiving module 10f configured to receive a second content reply message corresponding to the content-requesting message, where the second content reply message includes a second target coding block and an attribute field corresponding to the second target coding block; and a second sending module 10g configured to: if the receiving and sending information corresponding to the content-requesting message still exists in the PIT when the second content reply message is received, send the second content reply message to the terminal.

Figure 12:
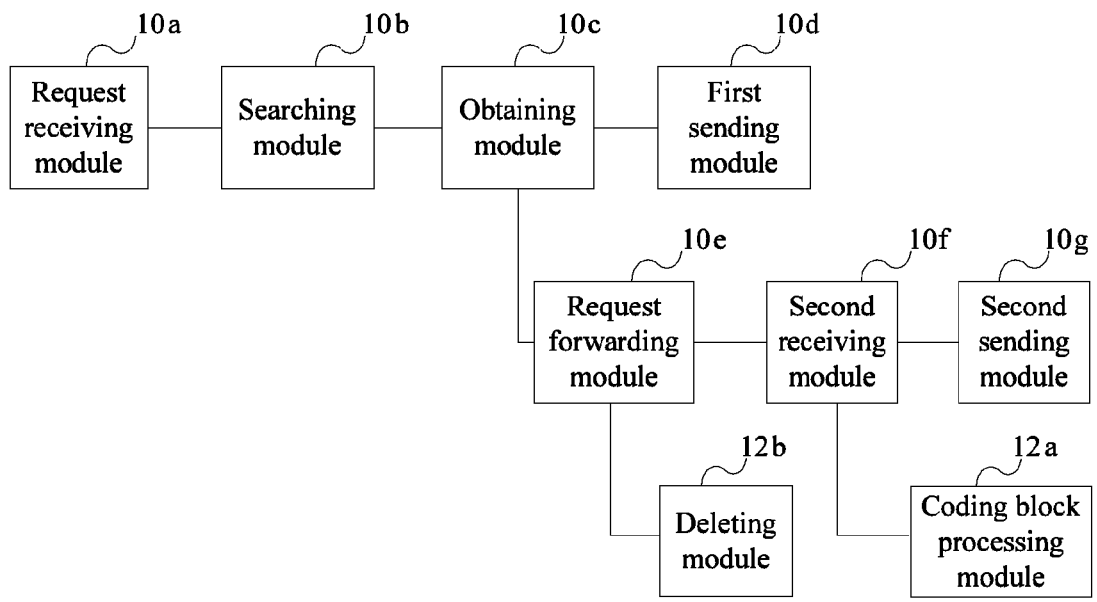
FIG. 12 is a schematic structural diagram of a CCN node according to another embodiment of the present invention.

FIG. 12 is a schematic structural diagram of a CCN node according to another embodiment of the present invention. As shown in FIG. 12, on the basis of the structure illustrated in FIG. 11, the CCN node according to the embodiment further includes: a coding block processing module 12a configured to: if the receiving and sending information corresponding to the content-requesting message no longer exists in the PIT when the second content reply message is received, perform an AND operation respectively on attribute fields corresponding to the second target coding block with the attribute field in the content block information, and when all results of the AND operation is non-zero, add the second target coding block and the attribute fields corresponding to the second target coding block to the coding block information; and a deleting module 12b configured to delete the receiving and sending information corresponding to the content-requesting message from the pending interest table.

The CCN nodes according to the foregoing embodiments may be used to execute the message processing method described in the foregoing embodiments, where the implementation principle and technical effects are similar, and will not be described repeatedly herein.

The CCN node according to the foregoing embodiment may receive a content-requesting message sent by a terminal device according to the foregoing embodiment, perform an AND operation on a request identifier in the content-requesting message with attribute fields in coding block information corresponding to the name of the requested content, and then use a coding block with which the AND operation produces a non-zero result as a target coding block for replying to the corresponding terminal, so that the terminal may obtain multiple linearly independent coding blocks corresponding to the requested content requested thereby to recover the content corresponding to the name of the requested content. Moreover, the coding blocks formed after linear coding outnumber the content blocks, the probability that the CNN nodes return the same target coding block is reduced, thereby helping to improve bandwidth utilization.

Figure 13:
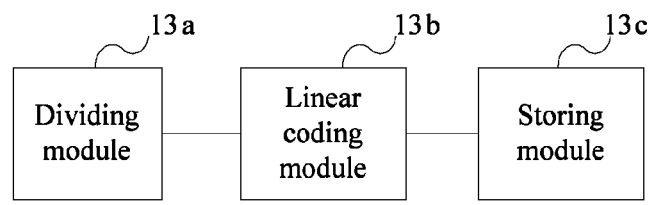
FIG. 13 is a schematic structural diagram of a content releasing apparatus according to an embodiment of the present invention.

FIG. 13 is a schematic structural diagram of a content releasing apparatus according to an embodiment of the present invention. Referring to FIG. 13, the content releasing apparatus according to the embodiment may include: a dividing module 13a configured to divide a content into at least two content blocks with an equivalent size; a linear coding module 13b configured to perform linear coding on the at least two content blocks to generate more coding blocks than the content blocks, where each coding block uniquely corresponds to one attribute identifier; the attribute identifier includes a name and an attribute field of the content; and the attribute field is a coefficient vector formed in the linear coding process; and a storing module 13c configured to store the multiple coding blocks and corresponding attribute identifiers in CCN nodes.

The CCN node according to the embodiment may be used to execute the message processing method described in the foregoing embodiments, where the implementation principle and technical effects are similar, and will not be described repeatedly herein. Specifically, the content releasing apparatus according to the embodiment may be set together with the terminal device or the CCN node according to the foregoing embodiments.

Figure 14:
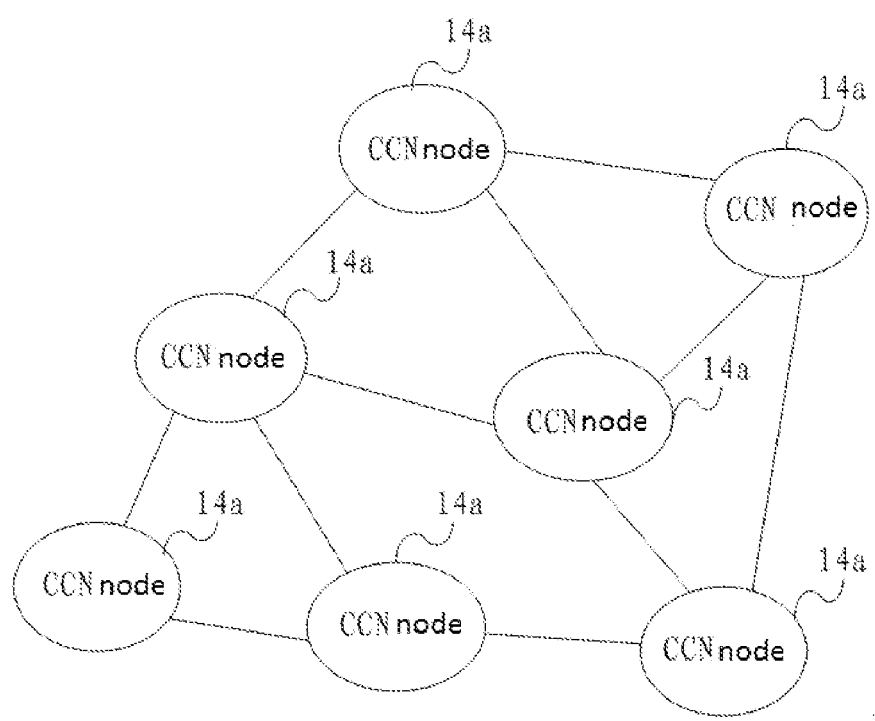
FIG. 14 is a schematic structural diagram of a CCN system according to an embodiment of the present invention.

FIG. 14 is a schematic structural diagram of a CCN system according to an embodiment of the present invention. Referring to FIG. 14, the CCN system according to the embodiment includes multiple CCN nodes 14a, where the CCN node according to any of the foregoing embodiments may be used. The implementation principle and technical effects thereof are similar to the foregoing embodiments, and will not be described repeatedly herein.

The CCN system according to the embodiment may implement converting more than two content blocks with an equivalent size obtained by dividing the same content into coding blocks by performing linear coding, and releasing the coding blocks to CCN nodes of the CCN, so that when a terminal requests a coding block, the CCN node may obtain, by performing an AND operation on the request identifier with an attribute field of the stored coding block, a target coding block for replying to the content request, thereby reducing the probability that different nodes return the same coding block, and improving bandwidth utilization.

Persons of ordinary skill in the art may understand that, all or a part of the steps of the foregoing method embodiments may be implemented by a program instructing relevant hardware. The foregoing programs may be stored in a computer readable storage medium. When the program runs, the steps of the forgoing method embodiments are performed. The foregoing storage medium includes various mediums capable of storing program code, such as a read-only memory (ROM), a random-access memory (RAM), a magnetic disk, or an optical disc. Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all the technical features thereof, as long as such modifications or replacements do not cause the essence of corresponding technical solutions to depart from the scope of the technical solutions of the embodiments of the present invention.

What is claimed is:

1. A message processing method, comprising:
receiving a content-requesting message from a terminal, wherein the content-requesting message comprises a name of a requested content, a request identifier, and excluded information, wherein the request identifier is used to identify at least one requested coding block, and wherein the excluded information comprises an attribute field of an obtained coding block;
determining coding block information corresponding to the requested content according to the name of the requested content and pre-stored coding block information, wherein the coding block information comprises a coding block and an attribute identifier corresponding to the coding block, wherein the coding block is generated by performing linear coding on at least two content blocks with an equivalent size obtained by dividing a content, and wherein the attribute identifier comprises a name and an attribute field of the content;
performing an AND operation on the request identifier respectively with attribute fields in the coding block information corresponding to the requested content to generate a plurality of results;
obtaining a coding block corresponding to an attribute field with which the AND operation produces a non-zero result and which is not part of the excluded information as a first target coding block, wherein the coding block is obtained by selecting the attribute field for which the AND operation produces a minimum result from the plurality of results;
using the coding block corresponding to the selected attribute field as the first target coding block; and
sending a first content reply message to the terminal, wherein the first content reply message comprises the first target coding block and the attribute field corresponding to the first target coding block;
forwarding the content-requesting message and adding receiving and sending information corresponding to the content-requesting message to a pending interest table (PIT) when no attribute field with which the AND operation produces a non-zero result is obtained, or obtained attribute fields with which the AND operation produces a non-zero result are part of the excluded information;
receiving a second content reply message corresponding to the content-requesting message, wherein the second content reply message comprises a second target coding block and an attribute field corresponding to the second target coding block;
sending the second content reply message to the terminal when the receiving and sending information corresponding to the content-requesting message still exists in the PIT when the second content reply message is received;
performing an AND operation respectively on attribute fields corresponding to the second target coding block with the attribute field in the coding block information when the receiving and sending information corresponding to the content-requesting message no longer exists in the PIT and the second content reply message is received; and
adding the second target coding block and the attribute fields corresponding to the second target coding block to the coding block information when all results of the AND operation are non-zero.

2. The message processing method according to claim 1, further comprising deleting the receiving and sending information corresponding to the content-requesting message from the pending interest table.

3. A content-centric network (CCN) node, comprising:
a non-transitory computer readable medium having instructions stored thereon; and
a computer processor coupled to the non-transitory computer readable medium and configured to execute the instructions to:
receive a content-requesting message from a terminal, wherein the content-requesting message comprises a name of a requested content, a request identifier, and excluded information, wherein the request identifier is used to identify at least one requested coding block, and wherein the excluded information comprises an attribute field of an obtained coding block;
determine coding block information corresponding to the requested content according to the name of the requested content and pre-stored coding block information, wherein the coding block information comprises a coding block and an attribute identifier corresponding to the coding block, wherein the coding block is generated by performing linear coding on at least two content blocks with an equivalent size obtained by dividing a content, and wherein the attribute identifier comprises a name and an attribute field of the content;
perform an AND operation on the request identifier respectively with attribute fields in the coding block information corresponding to the requested content to generate a plurality of results;
obtain a coding block corresponding to an attribute field with which the AND operation produces a non-zero result and which is not part of the excluded information as a first target coding block, wherein the coding block is obtained by selecting the attribute field for which the AND operation produces a minimum result from the plurality of results;
use the coding block corresponding to the selected attribute field as the first target coding block; and
send a first content reply message to the terminal, wherein the first content reply message comprises the first target coding block and the attribute field corresponding to the first target coding block;
forward the content-requesting message and add receiving and sending information corresponding to the content-requesting message to a pending interest table (PIT) when no attribute field with which the AND operation produces anon-zero result is obtained, or obtained attribute fields with which the AND operation produces anon-zero result are part of the excluded information;
receive a second content reply message corresponding to the content-requesting message, wherein the second content reply message comprises a second target coding block and an attribute field corresponding to the second target coding block;
send the second content reply message to the terminal when the receiving and sending information corresponding to the content-requesting message still exists in the PIT when the second content reply message is received;
perform the AND operation respectively on attribute fields corresponding to the second target coding block with the attribute field in the coding block information when the receiving and sending information corresponding to the content-requesting message no longer exists in the PIT when the second content reply message is received; and
add the second target coding block and the attribute fields corresponding to the second target coding block to the coding block information when all results of the AND operation are non-zero.

4. The CCN node according to claim 3, wherein the computer processor is further configured to execute the instructions to delete the receiving and sending information corresponding to the content-requesting message from the PIT.

5. A content-centric network (CCN) system, comprising:
a non-transitory computer readable medium having instructions stored thereon; and
a computer processor coupled to the non-transitory computer readable medium and configured to execute the instructions to:
receive a content-requesting message from a terminal, wherein the content-requesting message comprises a name of a requested content, a request identifier, and excluded information, wherein the request identifier is used to identify at least one requested coding block, and wherein the excluded information comprises an attribute field of an obtained coding block;

determine coding block information corresponding to the requested content according to the name of the requested content and pre-stored coding block information, wherein the coding block information comprises a coding block and an attribute identifier corresponding to the coding block, wherein the coding block is generated by performing linear coding on at least two content blocks with an equivalent size obtained by dividing a content, and wherein the attribute identifier comprises a name and an attribute field of the content;

perform an AND operation on the request identifier respectively with attribute fields in the coding block information corresponding to the requested content to generate a plurality of results;

obtain a coding block corresponding to an attribute field with which the AND operation produces a non-zero result and which is not part of the excluded information as a first target coding block, wherein the coding block is obtained by selecting the attribute field for which the AND operation produces a minimum result from the plurality of results;

use the coding block corresponding to the selected attribute field as the first target coding block; and send a first content reply message to the terminal, wherein the first content reply message comprises the first target coding block and the attribute field corresponding to the first target coding block;

forward the content-requesting message and add receiving and sending information corresponding to the content-requesting message to a pending interest table (PIT) when no attribute field with which the AND operation produces anon-zero result is obtained, or obtained attribute fields with which the AND operation produces anon-zero result are part of the excluded information;

receive a second content reply message corresponding to the content-requesting message, wherein the second content reply message comprises a second target coding block and an attribute field corresponding to the second target coding block;

send the second content reply message to the terminal when the receiving and sending information corresponding to the content-requesting message still exists in the PIT and the second content reply message is received;

perform an AND operation respectively on attribute fields corresponding to the second target coding block with the attribute field in the coding block information when the add the second target coding block and the attribute fields corresponding to the second target coding block to the coding block information when all results of the AND operation are non-zero.

6. The CCN system according to claim 5, wherein the computer processor is further configured to execute the instructions to delete the receiving and sending information corresponding to the content-requesting message from the PIT.

7. The message processing method according to claim 1, wherein the request identifier comprises a 4-bit binary sequence.

8. The CNN node according to claim 3, wherein the request identifier comprises a 4-bit binary sequence.

9. The CNN system according to claim 5, wherein the request identifier comprises a 4-bit binary sequence.

* * * * *

UNITED STATES PATENT AND TRADEMARK OFFICE
CERTIFICATE OF CORRECTION

PATENT NO. : 9,848,059 B2
APPLICATION NO. : 14/311075
DATED : December 19, 2017
INVENTOR(S) : Yan Zhefeng It is certified that error appears in the above-identified patent and that said Letters Patent is hereby corrected as shown below:

On the Title Page

Column 1 Line 2 under U.S. Patent Documents should read:
2009/0204727 A1 8/2009 Wang Tieying et al.

Column 2 Line 4 under Foreign Patent Documents should read:
WO 20090073454 A1 6/2009

Column 2 Line 11 under Other Publications should read:
Montpetit, et al., "Networking Coding Meets Information-Centric Networking: An Architectural Case for Information Dispersion Through Native Network Coding," NOM '12 Proceedings of the 1st ACM Workshop on Emerging Name-Orientated Mobile Networking Design-Architecture, Algorithms, and Applications, Jun. 6, 2012, pages 31-36.

Column 2 Line 17 under Other Publications should read:
Li, et al., "Linear Network Coding," IEEE Transactions on Information Theory, Vol. 49, No. 2, Feb. 2003, pages 371-381.

Signed and Sealed this
Twenty-second Day of May, 2018

Andrei Iancu
*Director of the United States Patent and Trademark Office*